No. 687,050. Patented Nov. 19, 1901.
T. F. MULLANEY.
INDICATING INSTRUMENT.
(Application filed Aug. 16, 1901.)
(No Model.)
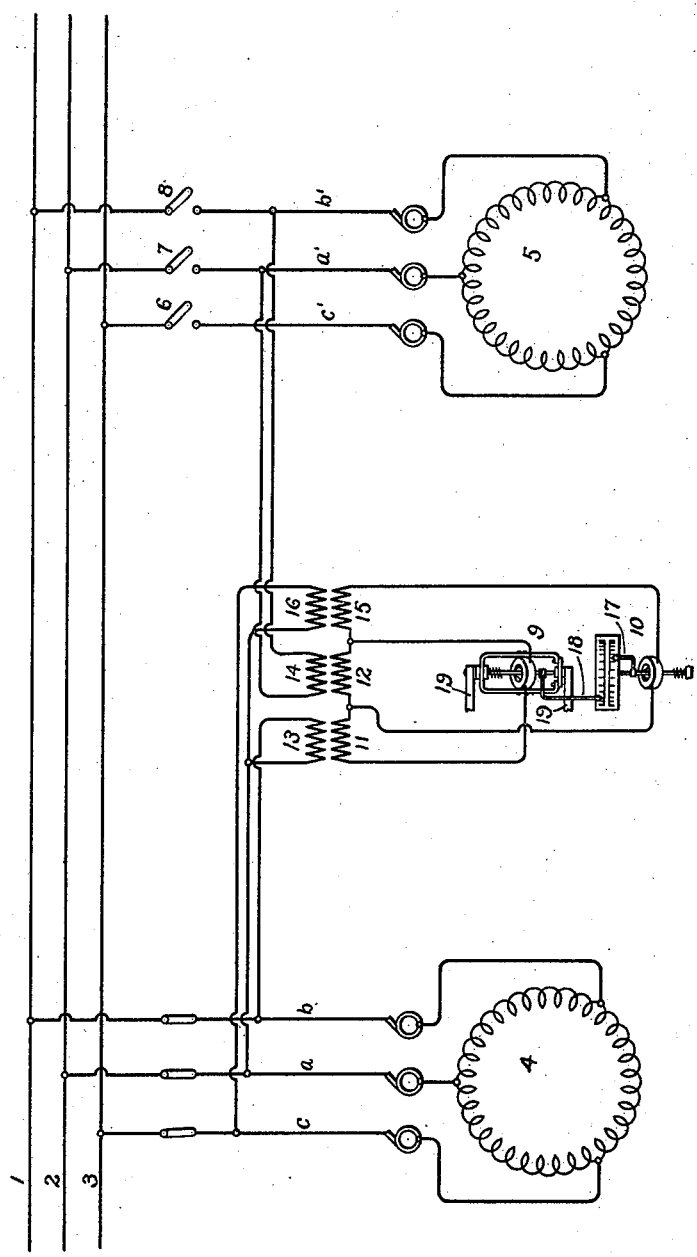
Witnesses.
John Ellis Glenn.
Benjamin B. Hill
Inventor.
Thomas F. Mullaney.
by Albert G. Davis
Atty.

UNITED STATES PATENT OFFICE.

THOMAS F. MULLANEY, OF NEW YORK, N. Y., ASSIGNOR TO GENERAL ELECTRIC COMPANY, A CORPORATION OF NEW YORK.

INDICATING INSTRUMENT.

SPECIFICATION forming part of Letters Patent No. 687,050, dated November 19, 1901.

Application filed August 16, 1901. Serial No. 72,238. (No model.)

*To all whom it may concern:*

Be it known that I, THOMAS F. MULLANEY, a citizen of the United States, residing at New York, in the county of New York, State of New York, have invented certain new and useful Improvements in Indicating Instruments, (Case No. 2,193,) of which the following is a specification.

My present invention relates to an arrangement of indicating devices which is particularly valuable in connection with the synchronizing of alternating-current dynamo-electric machines, although not, however, limited to use in this relation only.

In synchronizing-machines of the character mentioned it is becoming a common practice to employ two indicating instruments, such as voltmeters, one of the voltmeters being connected so as to have zero deflection when the machines are in synchronism and the other so connected as to have a deflection of some determinate amount, dependent upon the voltage of the machines. To determine the proper instant to throw the machines together, it is necessary to observe both voltmeters as nearly simultaneously as possible and to throw the machines together when one voltmeter reads zero and the other a value dependent upon the voltage of the machines. By my present invention this operation is much simplified and consists, briefly, in mounting the voltmeters together, so that their pointers move either over the same scale or at least so that their relative positions may be readily compared. The relative positions of the two voltmeters is made such that the pointer of one when it reads zero is located close to the pointer of the other voltmeter when the latter is in the position corresponding to synchronism between the machines. In case the voltage of the machines is changed it is evident that the position of the needle at the last-mentioned voltmeter will change accordingly. I therefore provide means whereby the needles of the two voltmeters may be brought together at this new voltage, whatever it may be. This means preferably consists in mounting one of the voltmeters so that it may move bodily with respect to the other, thereby securing the relative adjustment desired.

The scope of my invention is set forth in claims appended hereto, while the details of construction and arrangement of one embodiment of my invention are set forth in the following description, which is to be taken in connection with the accompanying drawing.

Referring to the drawing, 1, 2, and 3 indicate bus-bars of the three-phase system, to which is shown connected a three-phase generator, (indicated diagrammatically at 4.) A second three-phase generator is similarly indicated at 5; but the switches 6 7 8, which are adapted to connect it to the bus-bars, are represented in their open position.

In order to determine when the two machines 4 and 5 are in synchronism with each other, two voltmeters 9 and 10 are employed. The voltmeter 9 is connected across secondary windings 11 12 in series with each other. The primary windings 13 14, corresponding to the secondaries mentioned, are connected across corresponding phases of the respective machines 4 5, the winding 13 being shown as connected across the phase $a\,b$ of the machine 4 and the primary 14 across the phase $a'\,b'$ of the machine 5. When these two machines are in synchronism, it will be evident that the electromotive forces of the windings 11 and 12 will either exactly counterbalance each other or will be added together, dependent upon how the windings are joined in series. In the present instance the windings are supposed to be connected so that their electromotive forces neutralize each other, thereby giving zero deflection of the voltmeter 9 when the machines are in synchronism. The reading of this voltmeter, however, is not sufficiently sensitive to indicate with accuracy the instant of synchronism between the machines 4 and 5, but is employed to determine whether the machines are in conjunction or opposition to each other, a state of affairs between which the synchronizing-voltmeter 10 does not discriminate. This latter voltmeter 10 is connected across two series-connected secondaries 12 15, the primaries 14 and 16 of which are connected one across one phase of the machine 4 and the other across a non-corresponding phase of the machine 5. Thus the primary 14 is connected across the phase $a'\,b'$ of the machine 5, as already mentioned, while the primary 16 is connected across the non-corresponding phase $a\,c$ of the machine 4. When the machines are in synchronism, the voltmeter 10 will have a deflection corresponding to the resultant of the electromotive forces across the phases $a'\,b'$ and $a\,c$ of the respective machines.

In the drawing, the voltmeter-needle 17 of the voltmeter 10 is represented as having a deflection which may be assumed to be that which would exist when the machines 4 and 5 are in synchronism. In a similar manner the needle 18 of the voltmeter 9 is represented as having zero deflection, showing that the machines are in conjunction with each other. In order to recognize these conditions at a glance, the voltmeter 9 may be rotated bodily in bearings or other supports 19, so as to bring the needle 18 in its zero position directly over the position occupied by the needle 17 of the other voltmeter when the machines are running synchronously. Under these conditions the instant of synchronism is shown whenever the needles coincide in position. In case it be desired to synchronize the machines with different voltages, the voltmeters will require different relative adjustment, as will readily be understood without further explanation. It will of course be evident that this adjustment may be secured in a wide variety of ways and is not limited to the exact arrangement shown. Thus, for example, the voltmeter 9 might be stationary and the voltmeter 10 adjustable, or both voltmeters might be relatively fixed, and a needle of one or the other adjustable on its shaft. Various other arrangements will suggest themselves to one skilled in the art. Moreover, it will of course be evident that the invention may be used with machines of any number of phases and is not limited to use in connection with three-phase machines only.

What I claim as new, and desire to secure by Letters Patent of the United States, is—

1. In a synchronizing device, the combination of two voltmeters arranged so that the needles of both move in proximity to each other, and means for relatively adjusting the position of one voltmeter-needle with respect to the other.

2. In a synchronizing device, the combination of two voltmeters arranged so as to have their needles or pointers move in proximity to each other, means for causing the deflection of one voltmeter to represent the resultant of voltages corresponding respectively to like phases of the machines to be synchronized, and means for causing the deflection of the other voltmeter to represent the resultant of electromotive forces corresponding respectively to unlike phases of said machines.

3. The combination of superposed voltmeters, and means for adjusting the moving element of one voltmeter relatively to the moving element of the other voltmeter.

4. A synchronism-indicating device consisting of two voltmeters having needles arranged to move either over the same scale or into proximity to each other, and means for causing the needles to come together when synchronism is attained.

5. A synchronism-indicating device consisting of two voltmeters having the ends of their pointers or needles movable either over the same scale or into proximity to each other, means for causing a zero deflection of one voltmeter at synchronism and a predetermined deflection of the other voltmeter at synchronism, and means for relatively adjusting the voltmeters or parts thereof so that the pointer or needle of one is in close proximity to the other when synchronism exists.

In witness whereof I have hereunto set my hand this 14th day of August, 1901.

THOMAS F. MULLANEY.

Witnesses:
BENJAMIN B. HULL,
MARGARET E. WOOLLEY.